United States Patent [19]

Chiarella

[11] Patent Number: 4,578,120
[45] Date of Patent: Mar. 25, 1986

[54] BICYCLE CHAIN CLEANING DEVICE AND METHOD

[76] Inventor: Michele A. Chiarella, Via Valliorba 22, 6907 Lugano, Switzerland

[21] Appl. No.: 621,248

[22] Filed: Jun. 15, 1984

[51] Int. Cl.$^4$ ............................................. B08B 7/00
[52] U.S. Cl. ..................................... 134/9; 15/256.6; 134/40; 184/15.1
[58] Field of Search ............................. 134/9, 15, 40; 15/256.6; 280/295, 293, 280; 474/92; 184/15.1

[56] References Cited

U.S. PATENT DOCUMENTS

| | | | |
|---|---|---|---|
| 574,621 | 1/1897 | McCulloch et al. | 474/92 |
| 648,724 | 5/1900 | Cole | 15/256.6 |
| 1,962,404 | 6/1934 | Nichols et al. | 15/256.6 |
| 2,213,923 | 9/1940 | Stuart et al. | 134/15 |
| 2,535,428 | 12/1950 | Kubiak | 134/122 R |
| 2,893,516 | 7/1959 | Bocchino | 15/256.6 |
| 3,931,991 | 1/1976 | Marchello | 15/256.6 |

FOREIGN PATENT DOCUMENTS 7513848  3/1975  Netherlands ............. 134/15

Primary Examiner—Richard V. Fisher
Assistant Examiner—Sharon T. Cohen
Attorney, Agent, or Firm—Nicholas L. Coch; Martin Smolowitz

[57] ABSTRACT

A bicycle chain cleaning or lubricating device and method adapted for cleaning or lubricating bicycle chains in place without need for their removal and replacement. The device comprises a receptacle for enclosing a portion of a bicycle chain to be cleaned or lubricated and for containing a quantity of solvent or lubricant and a mating cover for the receptacle. The cover contains at least one rotatable sprocket brush having spaced-apart bristle tufts on its periphery and sized to fit closely into adjacent spaces in the bicycle chain, so that the movement of the chain through the device causes the chain and central brush to dip into the solvent or lubricant and then enter the spaces of the chain so as to clean or lubricate the chain as it is passed through the device. The receptacle and cover of the device are held together by suitable retainer means, such as a wire clamp located at the central portion of the device casing. Also, one or two secondary rotary sprocket brushes designed for interfitting into the openings of the chain are preferably provided in the receptacle for use in combination with the central primary sprocket. A stationary brush or absorbent pad can be attached to the device exit end to contact the chain and remove excess material from the moving chain.

20 Claims, 8 Drawing Figures

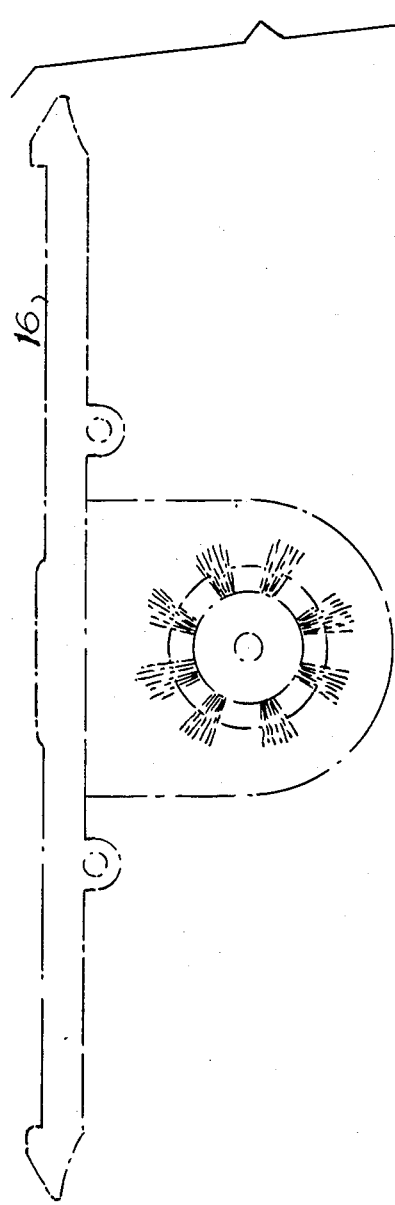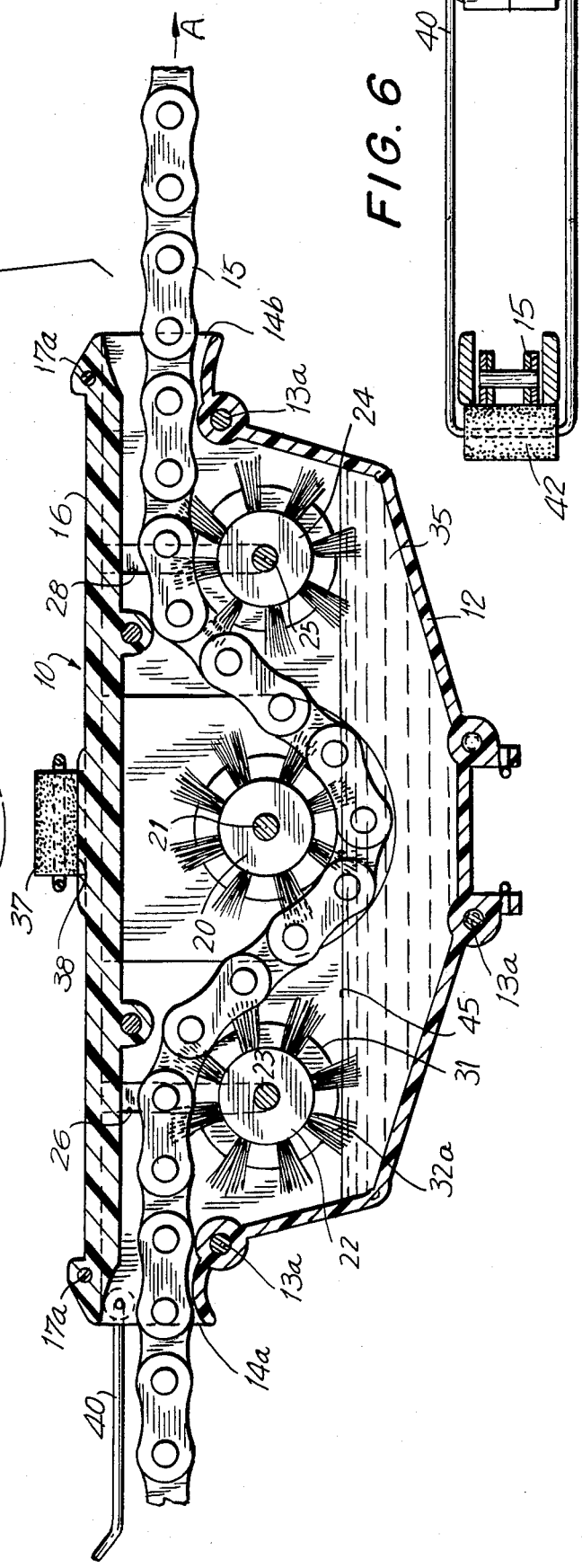
FIG. 5
FIG. 6

4,578,120

BICYCLE CHAIN CLEANING DEVICE AND METHOD

BACKGROUND OF INVENTION

The present invention relates to a device for and method of cleaning and lubricating bicycle chains, and is particularly directed to a self-contained cleaning device and method.

Because bicycle chains are exposed to dust and dirt during normal use, it is necessary for maintaining proper chain operation and achieving long service life, to clean and lubricate the chain periodically. Proper care of the drive chain is especially important for all bicycles and is especially important for multi-speed bicycles which use a derailleur type speed shifting mechanism. However, accomplishing thorough and effective cleaning of the drive chain has usually required that the chain be removed from the bicycle and immersed in a solvent and cleaned manually to remove all accumulated dust and grit from the chain, after which the chain is reinstalled on the bicycle. Because such cleaning of drive chains is quite time consuming, requires special tools to open the chain and is a dirty operation, it is usually not performed as frequently as is desirable.

Various devices for cleaning bicycle chains have been proposed, but they have either been relatively ineffective or have exhibited various disadvantages in their use.

example, U.S. Pat. No. 574,621 to McCulloch et al., discloses a brush arrangement for continuous external cleaning of a bicycle chain without the use of a solvent. U.S. Pat. No. 648,724 to Cole, discloses a bicycle chain cleaning device which uses an open receptacle for holding a quantity of solvent and has a fixed brush for contacting the chain while it is being rotated in the solvent; however, brushing occurs on only one side of the chain. More recently, U.S. Pat. No. 3,931,991 to Marchello, discloses a bicycle chain cleaning tray adapted to fit over the lower portion of a bicycle drive chain and hold a solvent for accomplishing solvent cleaning of the chain while it is assembled onto the bicycle, but without any brushing action. Thus, it has been found that the known prior art chain cleaning devices are not as effective or convenient to use as desired.

SUMMARY OF INVENTION

In accordance with the present invention, an enclosed self-contained device for cleaning bicycle chains is provided using at least one rotary sprocket brush and a solvent material contained in the device. The cleaning device comprises an elongated receptacle having an open top and adapted for enclosing a portion of the bicycle chain. The receptacle has openings at its opposite ends near the open top for passing a bicycle chain into and out of the enclosure and is further adapted for retaining a solvent in the lower portion thereof. An upper mating cover member for the receptacle, which is adapted to mate with the top of the receptacle, contains at least primary rotatable sprocket type brush. Suitable guide means are located at each end of the receptacle, for maintaining the bicycle chain in an interfitting relation with the primary rotatable sprocket brush. Clamping means are provided for retaining the receptacle and its mating cover member in a closed position about the chain being cleaned. It will be understood that the chain is maintained in an interfitting relation with the rotatable sprocket brush as a result of a moderate amount of tension provided by the central primary brush in its coaction with the guide means.

In a preferred embodiment of the invention, each of the dual guide means is also constructed as a rotatable sprocket brush. These secondary brushes are removably insertable into the receptacle and are located so as to maintain the bicycle chain in an interfitting relation with the respective brushes to provide for effective solvent cleaning of the inner surfaces of the chain. Similarly as for the single primary rotary brush embodiment, the chain in this alternative arrangement is maintained in interfitting contact with the sprocket tufts of all three brushes by the forces of the chain against the brushes, as produced by a moderate tension provided on the chain as it is passed through the cleaning device.

The present invention also provides a method for solvent cleaning a bicycle chain. This chain cleaning method includes the steps of filling a receptacle to a selected level with a solvent placing a free portion of the bicycle chain into the receptacle so that the free portion of the chain extends past opposite ends of the receptacle, inserting the chain within the receptacle above dual guide means or respective secondary rotary sprocket brushes, inserting into the receptacle an upper mating member carrying a primary rotatable sprocket brush and pulling the bicycle chain through the receptacle by tension applied to one end of the chain, thereby contacting the chain with the solvent and rotating at least the primary sprocket brush to interfit with openings in the chain so as to produce effective brushing and solvent cleaning of the inner parts of the chain. The brushes have tufts of bristles which are spaced apart and generally shaped to interfit into the openings in the bicycle chain being cleaned and such brushes are referred to herein as "sprocket brushes". The device receptacle and cover parts are held tightly together by a suitable clamping means, such as a spring wire bail arrangement which passes over a central portion of the device.

During use of the device for cleaning a bicycle chain, the bicycle and the receptacle are oriented generally upright so that the lower portion of the chain which surrounds the lower portion of the primary rotary sprocket brush and the ends of bristle tufts dip into the solvent as the chain is moved through the device. Also, if desired, during use the cleaning device is preferably attached to the derailleur unit of multi-speed bicycles to retain the cleaning device in proper location while the bicycle is hand pedalled backwards to pass the chain continuously through the cleaning device and the solvent liquid therein.

A major advantage of the present invention is that the cleaning device can be conveniently and easily placed around the chain to be cleaned. Another important advantage of the invention is that the cleaning solvent is retained within the receptacle to provide for convenient use, to minimize the amount of solvent required and to avoid solvent spillage. Another important advantage is that all the surfaces of the chain links are solvent immersed and brush cleaned by the spaced apart tufts of the rotating sprocket brushes which enter into the open spaces in each link of the chain to provide an effective cleaning of the chain.

Accordingly, it is an object of the present invention to provide a bicycle chain cleaning device which uses solvent in an enclosed casing and provides rotary brushes to effectively clean the bicycle chain surfaces and to overcome the deficiencies of prior devices.

It is another object to provide an enclosed cleaning device which can be conveniently and easily placed around the drive chain on a bicycle to effectively clean and service the chain.

It is a further object of the invention that the drive chain is cleaned by rotary brushes having tufts which interfit into openings in the chain, so that the interior portions of the chain are solvent cleaned more effectively by a positive brushing action.

These and other objects and advantages of this invention will become apparent upon reading the following description of which the attached drawings form a part

BRIEF DESCRIPTION OF DRAWINGS

The invention will be described by reference to the attached drawings, in which;

FIG. 5 shows a longitudinal sectional view of the chain cleaning device taken at line 5—5 of FIG. 4 with the bicycle chain in place and the cover member removable;

FIG. 6 shows a plan view of a holding means for retaining the cleaning device in a desired location and is taken along line 6—6 of FIG. 1;

DESCRIPTION OF INVENTION

Figure 1:
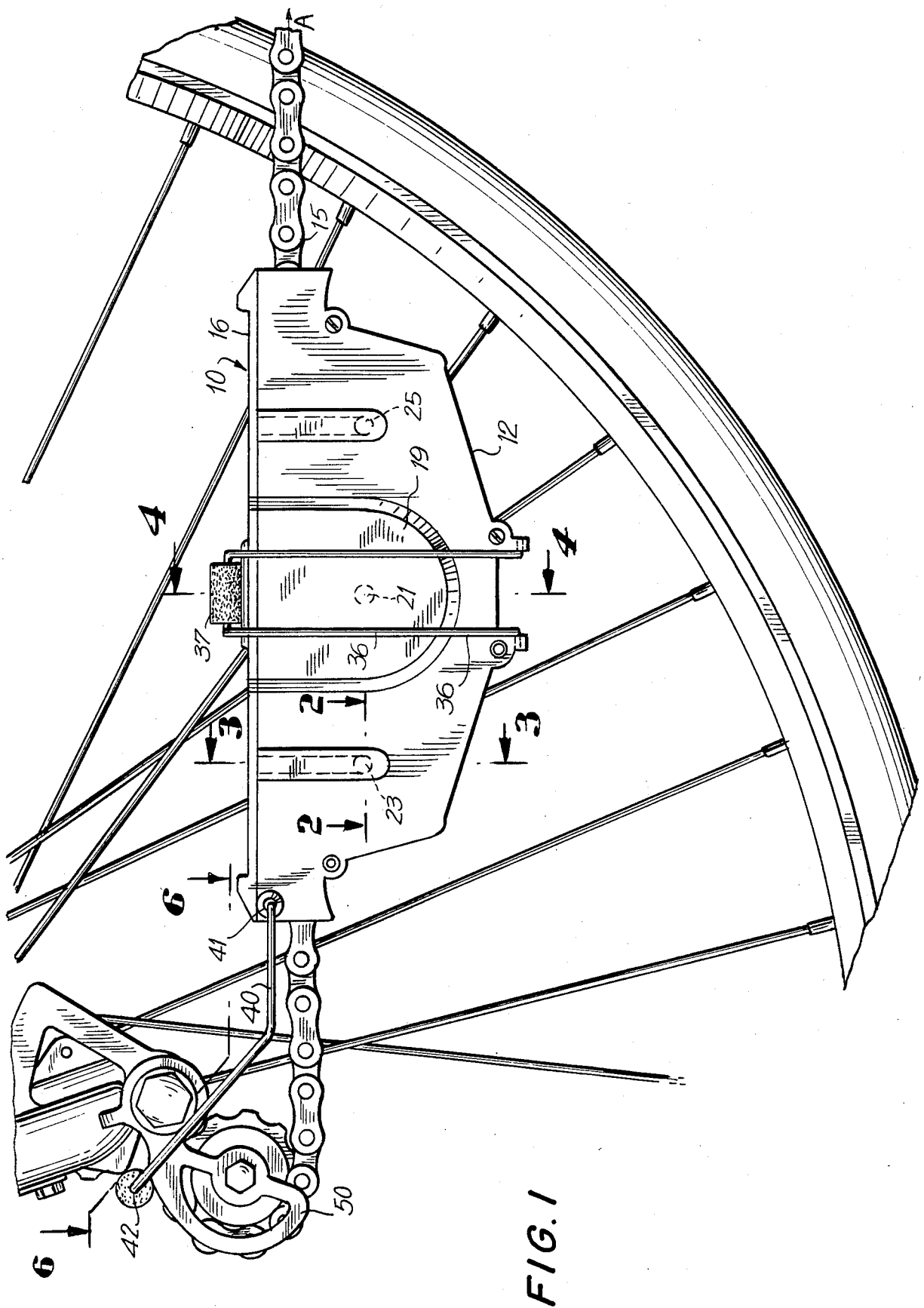
FIG. 1 shows an overall side elevation view of the roller chain cleaning device as installed for use in cleaning a bicycle chain drive.

The present invention will now be described in greater detail with reference to FIG. 1 showing a general view of the chain cleaning device in use on a bicycle. The chain cleaning device 10 includes an elongated narrow receptacle 12 which is usually constructed in two mating parts 12a and 12b longitudinally split along centerline 13. The receptacle 12 is constructed in two equal halves for reasons of economy of production. The halves rigidly are attached together by suitable fastening means such as threaded screws 13a, as are better shown in FIG. 5. The receptacle 12 has openings 14a and 14b near the open top at each end. The openings are sized to provide for passage of a bicycle chain 15 therethrough. The receptacle 12 is closed at its open top by a mating cover member 16, which is also split along longitudinal centerline 17 into mating parts 16a and 16b. The mating parts 16a 1 and 16b 1 are rigidly fastened together by suitable fastening means, such as threaded screws 17a. Cover member 16 is provided with dual flexible parallel extension portions 18a and 18b which interfit into mating dual enlarged portions 19a and 19b at each side of receptacle 12, as is better shown in FIG. 4. The receptacle 12 and cover 16 are usually made of a moldable dimensionally stable material which is preferably chemically resistant to the solvent material.

The cover member 16 contains a centrally located rotatable primary sprocket brush 20. The centrally located sprocket brush 20 is rotatable about shaft 21, which is held in place at each end thereof by the dual extension portions 18a and 18b which contain shaft bearing surfaces 18a' and 18b'. The central brush 20 and shaft 21 are insertable or removable by bending the dual flexible parallel extensions 18a' and 18b' apart, as shown in phantom lines in FIG. 4, so that bearing surfaces 18a and 18b separate, thus permitting the brush 20 and shaft 21 to be inserted or removed.

The dual end brushes 22 and 24 are each rotatable on shafts 23 and 25, respectively, which are each slidably insertable into dual vertical grooves 26 and 28 in receptacle 12. Dual end brushes 22 and 24 are fixed in position by the depth design of the vertical grooves as will be more fully discussed hereafter. Dual end brushes 22 and 24 and their respective shafts are removable by simply inverting receptacle 12 with the cover member 16 removed so they slide out of vertical grooves 26 and 28. Thus, all three brushes 20, 22 and 24 are removable from their respective shafts for cleaning or replacement purposes prior to use of the bicycle chain cleaning device.

Figure 4:
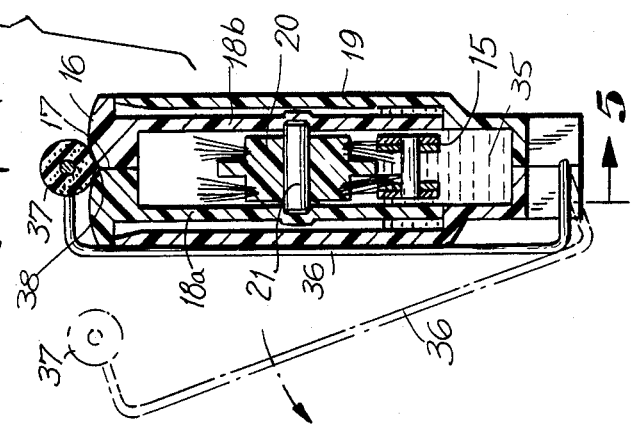
FIG. 4 shows a vertical sectional view taken at line 4—4 of FIG. 1 and shows the mounting of the primary central brush in the receptacle.
Figure 2:
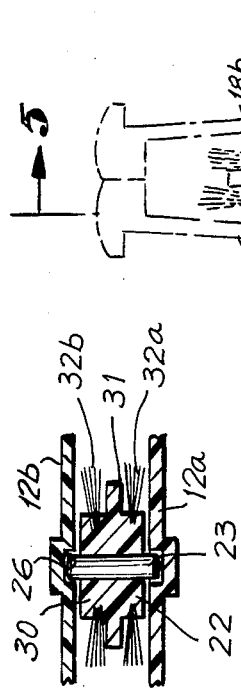
FIG. 2 shows a horizontal sectional view taken at line 2—2 through the cleaning device of FIG. 1.
Figure 3:
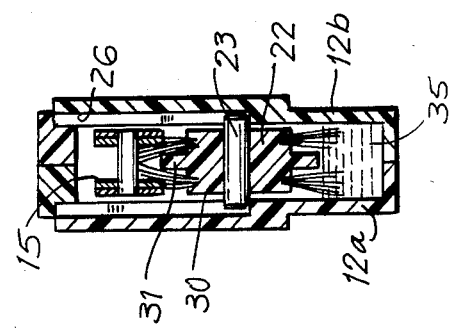
FIG. 3 shows a vertical sectional view of the cleaning device taken at line 3—3 through the device of FIG. 1.

As shown in FIGS. 2, 3, and 4, the brushes each have spaced tufted sprocket bristles provided around their periphery which are sized to interfit closely within openings in the bicycle chain. The length of the bristle tufts are approximately equal to the thickness of the chain being cleaned. The thickness of the bristle tufts are slightly smaller than the length of the hole in each link of the chain. It will be understood that as the chain 15 is moved through the receptacle during cleaning, each bristle tuft is forced into the holes in each link of the chain. Movement of the chain, caused by hand pedaling the chain backwards in the direction shown by the arrow A, causes all three sprocket wheels to rotate, which causes the bristle tufts into and out of successive holes in the chain.

As specifically shown in FIGS. 2 and 3, brush 22 includes a hub portion 30 having a centrally located guide ridge 31 extending radially outwardly from the hub 30. Located on each side of central ridge 31 are dual rows 32a and 32b of spaced apart bristle tufts. Central sprocket brush 20 shown in FIG. 4 and end brush 24 are each constructed similarly to the brush 22.

The openings 14a and 14b provided at each end of the receptacle 12 adjacent cover 16 are sized to be slightly larger than the roller chain 15 and are also curve shaped for passing the roller chain into and out of the casing during cleaning of the chain. A quantity of solvent 35 provided in the lower portion of the cleaning device receptacle 12 is sufficient to at least reach the chain 15 and the bristles of central brush 20 when the casing 12 is oriented in a generally upright position during use, as shown in FIG. 5. Any solvent may be used which is compatible with the material of the device and which will dissolve dirt and grease from the metal surfaces of the chain, and can include petroleum light fractions such as gasoline, kerosene, diesel fuel, etc.

The receptacle 12 and mating cover member 16 are held together by a suitable quick-release clamping means 36, such as a spring clamp which is hinged to the receptacle lower portion at 37 and having a roller which snaps over the cover at 38. Also, holding means 40 is provided attached at 41 to one end of the receptacle 12 and having a roller 42 located at the opposite end of the holding means for use in retaining the cleaning device 10 in a desired location during use, such as attached to the bicycle derailleur gear shifting unit 50.

The device may be attached to the bicycle chain for cleaning in a very simple manner as best shown in FIGS. 1 and 5. Thus, after brushes 20, 22 and 24 are in place in the cover 16 and receptacle 12, respectively, the lower portion of the receptacle 12 is filled with a solvent liquid to level 45 and the receptacle is then placed generally uprightly just below a free portion of the drive chain 15 generally near the rear wheel. The receptacle 12 is then raised so that each of two sprocket brushes 22 and 24 have at least one bristle tuft enter into a link hole in the chain and the ends of the chain entering and exiting the receptacle 12 lie in the openings 14a and 14b. The cover 16 containing central sprocket brush 20 is then carefully inserted into receptacle 12. Initially, a bristle tuft of the central sprocket brush is lined up with a link hole in the chain intermediate the two sprocket brushes 22 and 24 and then the entire cover 16 is forced into the receptacle 12 so that the dual parallel extension portions 18a and 18b of cover 16 interfit and mate with dual enlarged portions 19a and 19b of receptacle 12. The cover 16 is then clamped together by means of the clamping means 36. After the cleaning device thus is closed, the device is moved rearward toward the gear changer unit and is attached by holding means 40 to the bicycle gear changer unit 50 and the bicycle is then set in a generally immobilized upright position as shown in FIG. 1.

As best shown in FIG. 5, when the cover 16 is pressed into receptacle 12 during the chain attachment procedure the chain is tensioned into a down, under and up configuration. The shafts of dual secondary sprocket brushes 22 and 24 are held in place by the tensioned chain 15 against the lower ends of the vertical grooves 26 and 28. Thus, operation of the bicycle chain 15 by hand pedal movement in a backwards direction causes each of the tufted sprocket brushes 20, 22 and 24 to rotate and each of the dual rows of bristles to enter the openings in the chain to scrub and clean the drive chain. Portions of central brush 20 and portions of the chain 15 dip into the solvent below solvent level 45. Also, if desired, the device can be similarly used with dual guides instead of secondary sprocket brushes 22 and 24 for maintaining the roller chain 15 in interfitting relation with the central tufted sprocket brush 20.

Figure 7:
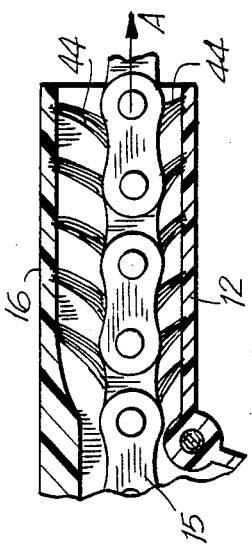
FIG. 7 shows a brush type element attached to the receptacle chain exit end for removing excess solvent from the bicycle chain.

During solvent cleaning of a roller chain 15 using cleaning device 10, an undesirable surplus amount of solvent sometimes remains on the chain. Such surplus liquid solvent material can be conveniently removed from the chain 15 by use of stationary brush 44 provided at the receptacle exit end 14b, as generally shown by FIG. 7. Such brushes can be provided attached to both receptacle 12 and cover member 16.

Figure 8:
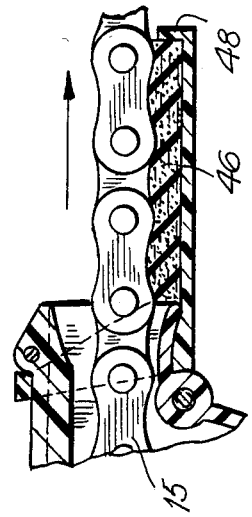
FIG. 8 shows an absorbent element or pad attached to the receptacle chain exit end for removing excess solvent from the bicycle chain.

Alternatively, surplus solvent can be wiped from the lower surface of chain 15 by providing a pad 46 of a removable absorbent material, retained in holder 48 which is hooked over the exit end of receptacle 12 and cover 16, as generally shown in FIG. 8. Upon completion of the cleaning cycle, the removable absorbent pad material 46 can be discarded and a fresh pad added for future use of the device.

The device can be utilized in a like manner for lubricating the bicycle chain after cleaning. The procedure for this operation is identical to the cleaning operation except the lubricant is substituted in the device for the solvent.

Although the invention has been described broadly and also in terms of a preferred embodiment, it will be understood that various modifications can be made within the scope of the invention, which is defined by the following claims.

I claim:

1. An enclosed device for solvent cleaning of bicycle chains, said device comprising:
   (a) an elongated receptacle having means defining an open top and adpapt for enclosing a bicycle chain portion therein, said receptacle having means defining an opening at its opposite ends sized to permit passing the bicycle chain therethrough, said receptacle being further adapted for retaining a solvent liquid in a lower portion thereof;
   (b) a mating cover member for closing the top opening of said receptacle, said cover member having at least one primary rotatable sprocket brush attached to the cover and extending into the receptacle, said brush being rotatable about an axis oriented substantially perpendicular to the direction of movement of the bicycle chain when passed through the receptacle, said brush having multiple tufts of bristles located about its periphery, said tufts being spaced apart and sized so as to interfit closely into openings of the bicycle chain passed through the receptacle;
   (c) guide means associated with said receptacle for maintaining the bicycle chain in an interfitting relation with said rotatable sprocket brush; and
   (d) clamping means attached to said device for retaining the receptacle and the mating cover member together in a closed position, so as to enclose the bicycle chain and retain a solvent liquid material in the lower portion of the receptacle, whereby the bicycle chain can be passed through the receptacle and interfitted with the tufts of said sprocket brush to provide for effective solvent and brush cleaning of the chain.

2. A chain cleaning device according to claim 1, wherein said primary rotatable brush is removably attached to said cover member by dual parallel extension portions of the cover.

3. A device according to claim 1, wherein at least one of said guide means is a rotatable secondary sprocket brush having multiple tufts spaced apart and sized to interfit into openings in the chain.

4. A device according to claim 1, wherein said clamping means is a wire bail hinged to said receptacle and snapped into place over said cover member for holding the parts together.

5. A chain cleaning device according to claim 1, wherein means for maintaining the solvent liquid is provided in said receptacle, said liquid being maintained at a level such that the lower portion of the chain surrounding the central primary brush is in contact with the solvent liquid within the receptacle.

6. A device according to claim 1, wherein said receptacle is formed by equal halves longitudinally split on a centerline and retained tightly together.

7. A device according to claim 1, wherein said cover member is formed by two longitudinally split mating halves, which are retained tightly together.

8. A chain cleaning device according to claim 1, wherein means for receiving excess liquid from the chain when passed through the device is provided on the device.

9. A chain cleaning device according to claim 1, wherein a stationary brush is provided for contacting said chain just prior to its exit from the device to remove excess liquid from the chain.

10. A device according to claim 1, wherein an absorbent pad is provided adjacent said opening in the receptacle exit end for contacting said chain being passed through the receptacle.

11. A device according to claim 1, wherein said receptacle and cover member are disposed about a bicycle drive chain and said device is attached to the bicycle so that the device remains stationary during use.

12. A device according to claim 11, wherein a holding means is provided attached to one end of said receptacle for use inretaining said device to said bicycle during use.

13. An enclosed self-contained device for solvent cleaning bicycle chains, said device comprising:
 (a) an elongated receptacle having means defining an open top and adapt for enclosing a bicycle chain portion, said receptacle having means defining further openings at opposite ends of said open top and sized to permit a bicycle chain to be passed therethrough, and said receptacle being further provided with means for retaining a solvent liquid in a lower portion thereof;
 (b) a removable cover member for closing said receptacle top opening and having means for retaining said cover member having at least one rotatable primary sprocket brush in combination with said cover member and capable of being inserted into said receptacle, said sprocket brush being substantially centrally located therein;
 (c) dual secondary rotatable sprocket brushes spaced apart from the priamry centrally located brush, each dual secondary brush being located at opposite ends of said receptacle; and
 (d) clamping means for retaining the receptacle and cover member together in a closed position, whereby a bicycle chain can be passed through the receptacle and threaded through the intervening spaces between said adjacent rotatable sprocket brushes to provide solvent and brush cleaning of the chain.

14. A chain cleaning device according to claim 13, wherein said primary sprocket brush is removably attached to said cover member.

15. A chain cleaning device according to claim 13, wherein said primary sprocket brush is removably attached to dual parallel extensions from said cover member and which parallel extensions interfit into mating enlarged portions of said receptacle.

16. An enclosed self-contained device for solvent cleaning bicycle chains by rotary brushing action, said device comprising:
 (a) an elongated receptacle having two longitudinally split mating halves retained tightly together, said receptacle having means defining an open and top and adapted for enclosing a bicycle chain portion therein, said receptacle having means defining an opening at its inlet end and at its exit end sized for passing a bicycle chain therethrough. and said receptacle being provided with means for retaining a solvent liquid in a lower portion thereof;
 (b) a removable cover member for closing the open top of said receptacle, said cover member containing a rotatable primary sprocket brush centrally located within said cover member and extending into said receptacle, said bursh having dual rows of multiple spaced apart tufts sized to interfit into openings in the bicycle chain being drawn through said receptacle for cleaning the chain;
 (c) a pair of rotatable secondary sprocket brushes disposed at opposite ends of said receptacle, each of said secondary sprocket brushes having dual rows of multiple spaced-apart tufts sized to interfit into openings in the bicycle chain, said secondary sprocket brushes being adapted to cooperate with said primary centrally located sprokcet brush for cleaning the bicycle chain; and
 (d) clamping means attached to said receptacle for retaining said receptacle and mating cover together in a closed position, whereby the bicycle chain is passed through the receptacle and threaded through the intervening spaces between the adjacent rotatable sprocket brushes to permit the bicycle chain interior surfaces to coact with the respective rotatable sprocket brush tufts during cleaning of the chain.

17. A method for cleaning or lubricating a bicycle chain, said method comprising
 (a) filling a receptacle having an open top to a selected level with a solvent or lubricant;
 (b) placing a bicycle chain intermediate portion into the receptacle so that the chain extends past opposite ends of the receptacle;
 (c) inserting into the receptacle an upper mating member and closing the top opening; said mating member carrying a primary rotary sprocket brush and enclosing the bicycle chain within the receptacle in contact with the solvent or lubricant therein so as to interfit with said primary rotary brush; and
 (d) pulling the bicycle chain through the receptacle by tension applied to one end of the chain, thereby contacting the chain with the solvent or lubricant and rotating the primary sprocket brush to interfit with said bicycle chain so as to brush the chain.

18. A method according to claim 17, wherein said receptacle contains at least one secondary sprocket brush rotatably located in one end thereof, said roller chain interfitting with the primary and with at least one secondary rotatable sprocket brush as the chain is pulled through the receptacle and the solvent.

19. A method according to claim 17, wherein after contacting the solvent the chain is moved past a wiper element located at the exit end of the receptacle, so as to contact the element and remove excess solvent from the chain.

20. A method for solvent cleaning a bicycle drive chain on a bicycle said method comprising;
 (a) filling a receptacle having an open top to a selected level with a solvent;
 (b) placing the bicycle drive chain intermediate portion into the receptacle, said receptacle containing at least one secondary sprocket brush rotatably located in one end thereof so that the chain extends over the secondary sprocket brush and past opposite ends of the receptacle;
 (c) inserting into the receptacle an upper mating member and closing the top opening, said mating member carrying a primary rotatable sprocket brush, and enclosing the bicycle drive chain within the receptacle in contact with the solvent so as to interfit the chain with said primary and secondary rotary sprocket brushes; and
 (d) hand pedaling the bicycle chain backwards thus pulling the bicycle drive chain through the receptacle by tension applied to one end of the chain, thereby contacting the solvent and rotating the primary and secondary sprocket brushes to interfit with openings in said roller chain so as to solvent brush clean the bicycle drive chain.

* * * * *

UNITED STATES PATENT AND TRADEMARK OFFICE
CERTIFICATE OF CORRECTION

PATENT NO. : 4,578,120
DATED : March 25, 1986
INVENTOR(S) : Michele A. CHIARELLA It is certified that error appears in the above-identified patent and that said Letters Patent is hereby corrected as shown below:

Kindly correct the specification as follows:

Column 1, line 31, before "example" insert --For-- line 61, after "least" insert --one--
Kindly correct the claims as follows:
Column 6, line 10, after "and" the word should read --adapted--

Line 14, change "inretaining" to --in retaining-- line 19, the word should read --adapted-- line 56, delete "and"

Column 8, line 8, change "sprokcet" to --sprocket--

Signed and Sealed this

Twenty-sixth Day of August 1986

[SEAL]

Attest:

DONALD J. QUIGG

Attesting Officer    Commissioner of Patents and Trademarks